(12) United States Patent
Hall, II

(10) Patent No.: US 9,565,934 B2
(45) Date of Patent: Feb. 14, 2017

(54) FISHING ROD HOLDER

(71) Applicant: Terry L. Hall, II, Hilton Head, SC (US)

(72) Inventor: Terry L. Hall, II, Hilton Head, SC (US)

( * ) Notice: Subject to any disclaimer, the term of this patent is extended or adjusted under 35 U.S.C. 154(b) by 305 days.

(21) Appl. No.: 13/843,918

(22) Filed: Mar. 15, 2013

(65) Prior Publication Data

US 2014/0263113 A1 Sep. 18, 2014

(51) Int. Cl.
*A47B 81/00* (2006.01)
*B60R 7/08* (2006.01)

(52) U.S. Cl.
CPC .............. *A47B 81/005* (2013.01); *B60R 7/08* (2013.01)

(58) Field of Classification Search
CPC ...... A01K 97/10; A01K 97/08; A47B 81/005; B60R 7/08; B60R 7/06
USPC ............................ 224/922, 503, 403; 43/21.2
See application file for complete search history.

(56) References Cited

U.S. PATENT DOCUMENTS

| | | | |
|---|---|---|---|
| 3,484,066 A * | 12/1969 | Aunspaugh | 248/541 |
| 4,871,099 A | 10/1989 | Bogar | |
| 5,205,446 A | 4/1993 | Greenberg | |
| 5,435,473 A | 7/1995 | Larkman | |
| 5,715,952 A | 2/1998 | Chichetti | |
| 5,813,164 A * | 9/1998 | Liberto | 43/21.2 |
| 5,815,976 A | 10/1998 | Jernigan | |
| 5,987,804 A * | 11/1999 | Shearer et al. | 43/21.2 |
| 6,530,170 B1 | 3/2003 | Sweeney | |
| 6,739,084 B1 | 5/2004 | Hansen | |
| 8,746,469 B1 * | 6/2014 | De La Torre | 211/70.8 |
| 2005/0102881 A1 * | 5/2005 | Legendziewicz | 43/21.2 |
| 2007/0044367 A1 * | 3/2007 | Slatter | 43/21.2 |
| 2008/0053360 A1 * | 3/2008 | Salerno | 114/343 |
| 2008/0134563 A1 * | 6/2008 | Gunter | 43/16 |
| 2012/0017487 A1 * | 1/2012 | O'Keefe | 43/21.2 |
| 2013/0333268 A1 * | 12/2013 | Henry, Jr. | 43/4.5 |
| 2014/0346206 A1 * | 11/2014 | McKnight et al. | 224/404 |

* cited by examiner

*Primary Examiner* — Corey Skurdal
(74) *Attorney, Agent, or Firm* — Carl E. Knochelmann, Jr.

(57) ABSTRACT

A fishing rod holder assembly for securing, transporting and dispensing a plurality of fishing rods is disclosed. The invention herein provides a convenient way to secure, transport and dispense fishing rods from a vehicle such as a pickup truck. The fishing rod holder rotates and tilts the fishing rods to a stowed position to prevent the fishing rods from being bounced around and becoming damaged, especially during transport. The invention lowers the fishing rods to a horizontal position during transport to prevent possible damage to the expensive fishing rods as a result of their sticking up above the profile of a pickup truck and being exposed to the high velocity air when traveling at expressway speeds or becoming entangled with low hanging vegetation or other obstacles while driving down a road. By lowering the fishing rods to a position in the bed of a truck, a cover could then be placed over the bed of a pickup truck to enhance the security of the fishing rods by keeping them out of sight and by providing protection from the elements.

4 Claims, 8 Drawing Sheets

FISHING ROD HOLDER

FIELD OF THE INVENTION

This invention relates to fishing rod holders and more particularly to a new fishing rod holder for the securing, transporting, and dispensing of a plurality of fishing rods. The intent of this invention is to make a fishing rod holder that will facilitate the use of multiple fishing rods by safely securing each fishing rod in an organized manner for transportation and making each stored fishing rod convenient to retrieve and to stow as needed.

In the accompanying drawings and explanation, one can readily see that the ability to rotate and tilt the fishing rod holder is important to the proper functioning of the invention. The pivoting, sequencing and tilting of the fishing rod holder play a key role in the securing, transporting and dispensing of the fishing rods in the embodiments described herein.

DESCRIPTION OF THE PRIOR ART

Fishing rod holders have been used for some time and are comprised of a multitude of embodiments fulfilling various applications. Usually, the fishing rod holders are attached to the bed of a truck or a wall or some other fixed object and fulfill only one objective.

Available in the prior art are fishing rod holders as described in U.S. Pat. Nos. 6,739,084; 5,813,164; 5,205,446; 5,815,976; 5,715,952; 6,530,170 B1; 5,435,473; and 4,871,099.

The fishing rod holders described in the prior art have disadvantages that the present invention overcomes. The fishing rod holder described herein provides a convenient way to secure, transport and dispense fishing rods from a vehicle such as a pickup truck. The fishing rod holder rotates and tilts the fishing rods to a stowed position to prevent the fishing rods from being bounced around and becoming damaged, especially during transport. A cover could then be placed over the bed of a pickup truck to enhance the security of the fishing rods by keeping them out of sight and by providing protection from the elements.

In these respects, the fishing rod holder assembly described herein has been developed to protect a plurality of expensive fishing rods during transport in a vehicle. The ability to lower the fishing rods to a horizontal position during transport prevents damage to the fishing rods as a result of their sticking up above the profile of a pickup truck and being exposed to the high velocity air when traveling at expressway speeds or becoming entangled with low hanging vegetation or other obstacles while driving down a road.

SUMMARY OF THE INVENTION

This invention provides a fishing rod holder assembly for securing, transporting, and dispensing a plurality of fishing rods. Various manual, motorized or a combination of manual and motorized embodiments are contemplated herein.

In a first manually operated embodiment of the fishing rod holder assembly, a base is attached to the bed of a pickup truck or other suitable vehicle. The base can have multiple embodiments such as a flat plate clamped, screwed, welded or pinned to the truck bed floor or can have a first and a second right angle brackets spaced apart by a plurality of connecting struts configured to secure the fishing rod holder assembly to a bed of a pickup truck with clamps or other non-permanent attachment.

A cylindrical spindle is vertically attached to the base and has a vertical axis that defines a pivoting axis for a cylindrical pivot tube that is coaxial with the cylindrical spindle configured to pivot around the vertical axis of the cylindrical spindle. A mount tube is horizontally attached to the pivot tube and has a horizontal axis to define a tilt axis for a rod tube base tiltably attached to the mount tube and located along the horizontal axis. A plurality of rod tubes that individually secure a single fishing rod for transporting and dispensing a fishing rod are connected to the rod tube base.

Each of the rod tubes is an elongated tube usually configured as a cylindrical tube having a top end and a bottom end sized to receive a fishing rod. The bottom end of the rod tube supports the weight of a fishing rod and may comprise a solid bottom. Alternatively, the weight of each fishing rod will be supported at the bottom end of each rod tube by a rod retaining pin extending through the bottom end of the rod tube that creates an open ended bottom that permits drainage of any water that may tend to collect in the bottom of a closed bottom rod tube. Each fishing rod is secured in each rod tube by a clamping mechanism such as a retaining screw threaded through a threaded hole in the top end of the rod tube that compresses the fishing rod against the wall of the rod tube.

The mount tube is pivoted around the vertical axis by rotating the pivot tube with a pivot release screw handle that can be locked in a desired position. The pivot position is locked by turning the pivot release screw handle to compress a lock block around the pivot tube to maintain a desired pivot position with a clamping action on the cylindrical spindle. Other means for locking the pivot position can readily be used to lock the pivot tube around the spindle and are anticipated herein.

The rod tube holders are tilted to a desired position by rotating the rod tube base around the horizontal axis with a stow release screw handle. The rod tube base is connected to the mount tube by a tilt block and a tilt lock block that are aligned with each other and cooperate along the mount tube to permit tilting of the rod tube base and are fixedly attached to the rod tube base. The stow release screw handle acts as a lever arm to facilitate the tilting of the rod tube base and locates and locks the rod tube base in a desired tilt position by compression of the tilt lock block when the stow release screw handle is turned.

In an alternate embodiment of the first manually operated fishing rod holder assembly described above, the rod tube base is replaced with a stow pivot tube. The stow pivot tube is shorter than the mount tube and is configured coaxially with said mount tube and has a plurality of rod tubes each configured for securing, transporting and dispensing a fishing rod. An end collar and a rod collar limit axial movement of the stow pivot tube along said mount tube. A tilt lock block is fixedly attached to the stow pivot tube surrounding the mount tube and has a stow release screw handle for locating and locking the stow pivot tube in a desired tilt position by compression.

In a combination manual and motorized embodiment of the fishing rod holder assembly, a spindle having a vertical axis is vertically attached to a base. A mount tube is horizontally attached to the spindle and has a horizontal axis. A motorized rod tube base is fixedly attached to the mount tube by an offset arm and is located along and generally parallel to the horizontal axis. The motorized rod tube base comprises a holder tube having a proximal end and a distal end fixedly attached to the mount tube by the offset arm and aligned generally parallel to the horizontal axis at a fixed distance from the mount tube. A reversible cassette motor is attached to the proximal end of the holder tube and has a through output shaft having an upper output end and a lower output end collinear with each other and each located on opposing ends of the through output shaft. An upper drive pulley is secured to the upper output end and a lower drive pulley is secured to the lower output end. An elongated idler shaft extends through the distal end of the holder tube configured in parallel with the through output shaft having an upper end and a lower end. An upper idler pulley is rotationally attached to the upper end of the elongated idler shaft and a lower idler pulley is rotationally attached to the lower end of the elongated idler shaft. An upper conveyor connects the upper drive pulley and the upper idler pulley. A lower conveyor connects the lower drive pulley and the lower idler pulley. A carousel path is formed by rod tubes extending between and connected to the upper conveyor and to the lower conveyor and are configured in parallel with each other and spaced around the upper conveyor and the lower conveyor. A control circuit is located on the spindle or at any other suitable position to cycle the cassette motor to sequentially position each of the rod tubes at the proximal end of the holder tube.

The motorized rod tube base is positioned in a stowed position by rotating the motorized rod tube base around the horizontal axis of the mount tube to a desired tilt position. Mated through holes in the spindle are configured to receive the mount tube. An emergent end of the mount tube is created by extending the mount tube through the mated through holes in the spindle. A locking hole is located in the spindle, either coaxial with the spindle or perpendicular to the vertical axis, and extends into the mating through hole. A plurality of tilt holes are spaced circumferentially around the mount tube and located in the mating through holes and are configured to receive a lock pin as it is inserted through the locking hole to define a tilt position of the motorized rod tube base. A stow handle perpendicularly attached to the emergent end of the mount tube acts as a lever to facilitate the rotation of the mount tube to a desired tilt position in order to permit the lock pin to engage a corresponding tilt hole.

In a fully motorized embodiment of the fishing rod holder assembly, the motorized rod tube base described above is tilted around the horizontal axis of the mount tube to a desired tilt position with a reversible stowing motor. The stowing motor is connected to the emergent end of the mount tube and configured to rotate the mount tube clockwise or counterclockwise to a desired tilt position. An electrical circuit, located in the vertical spindle or at some other suitable position, controls the position of the stowing motor.

DETAILED DESCRIPTION OF THE INVENTION

Figure 1:
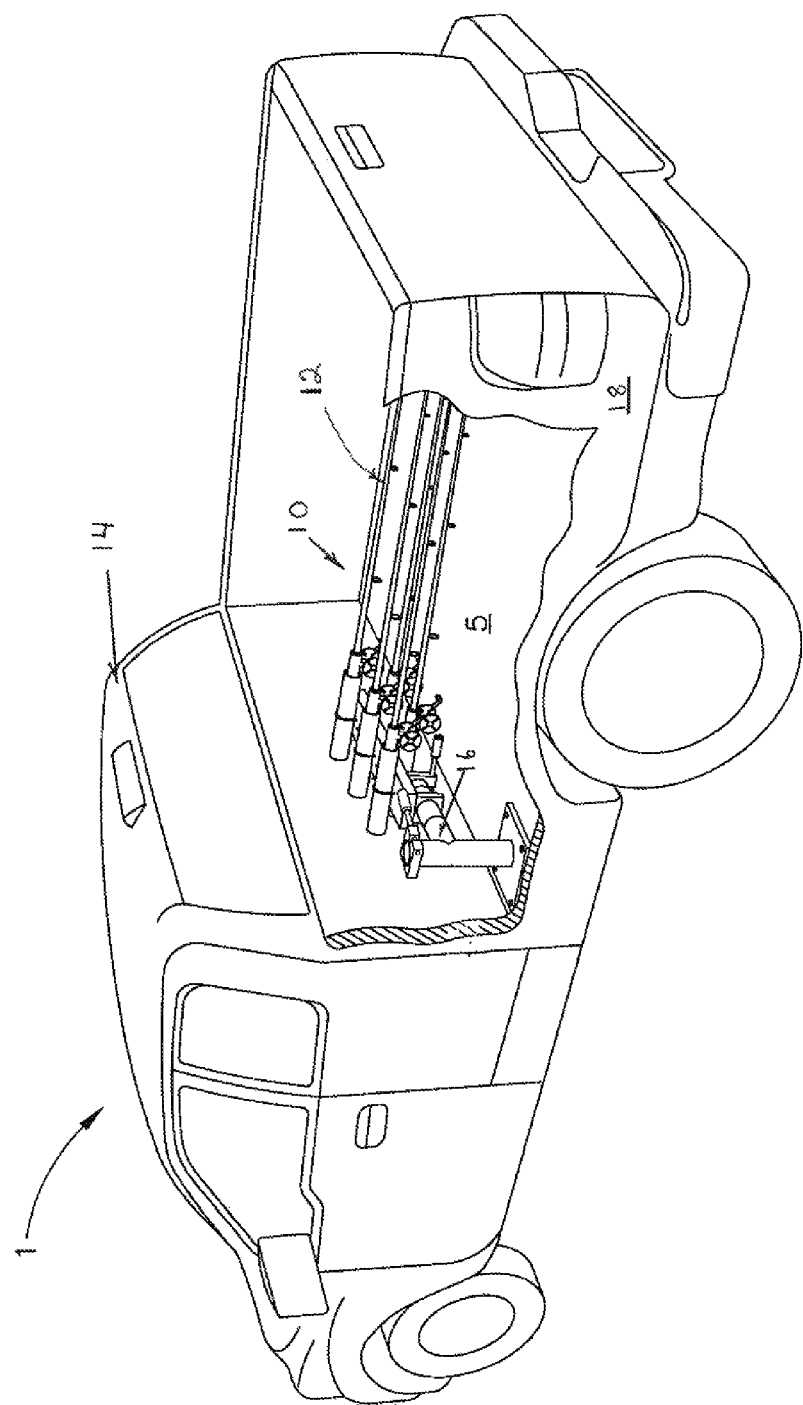
FIG. 1 is a perspective view of a fishing rod holder assembly installed in the bed of a pickup truck in the stowed position.

With reference to the drawings, namely FIGS. 1 through 8, a new fishing rod holder assembly depicting the present invention in one or more embodiments, generally designated by reference numerals 10, 20, 30, and 40 will be fully described.

Figure 2:
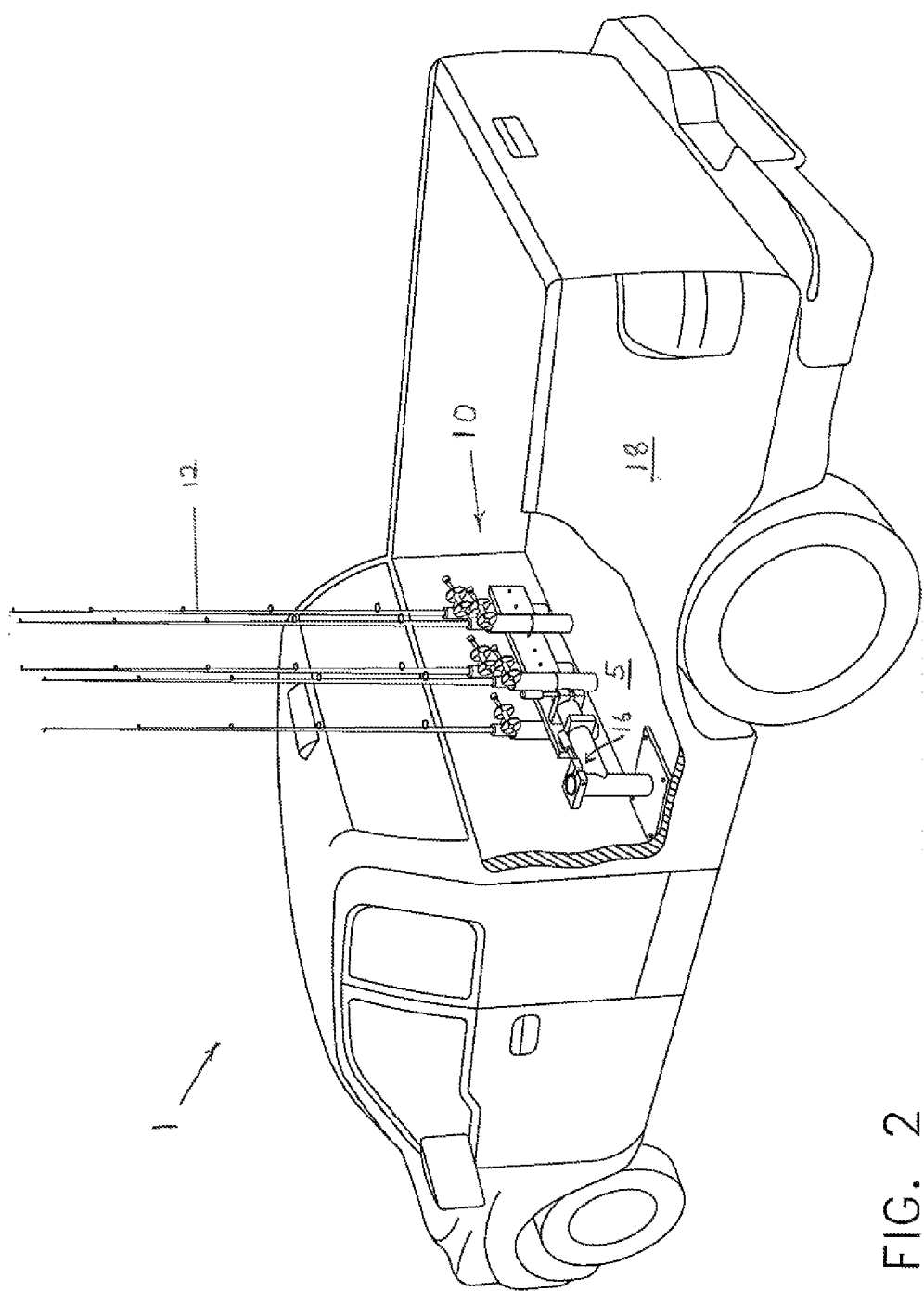
FIG. 2 is a perspective view of a fishing rod holder assembly installed in the bed of a pickup truck in the vertical position.
Figure 3:
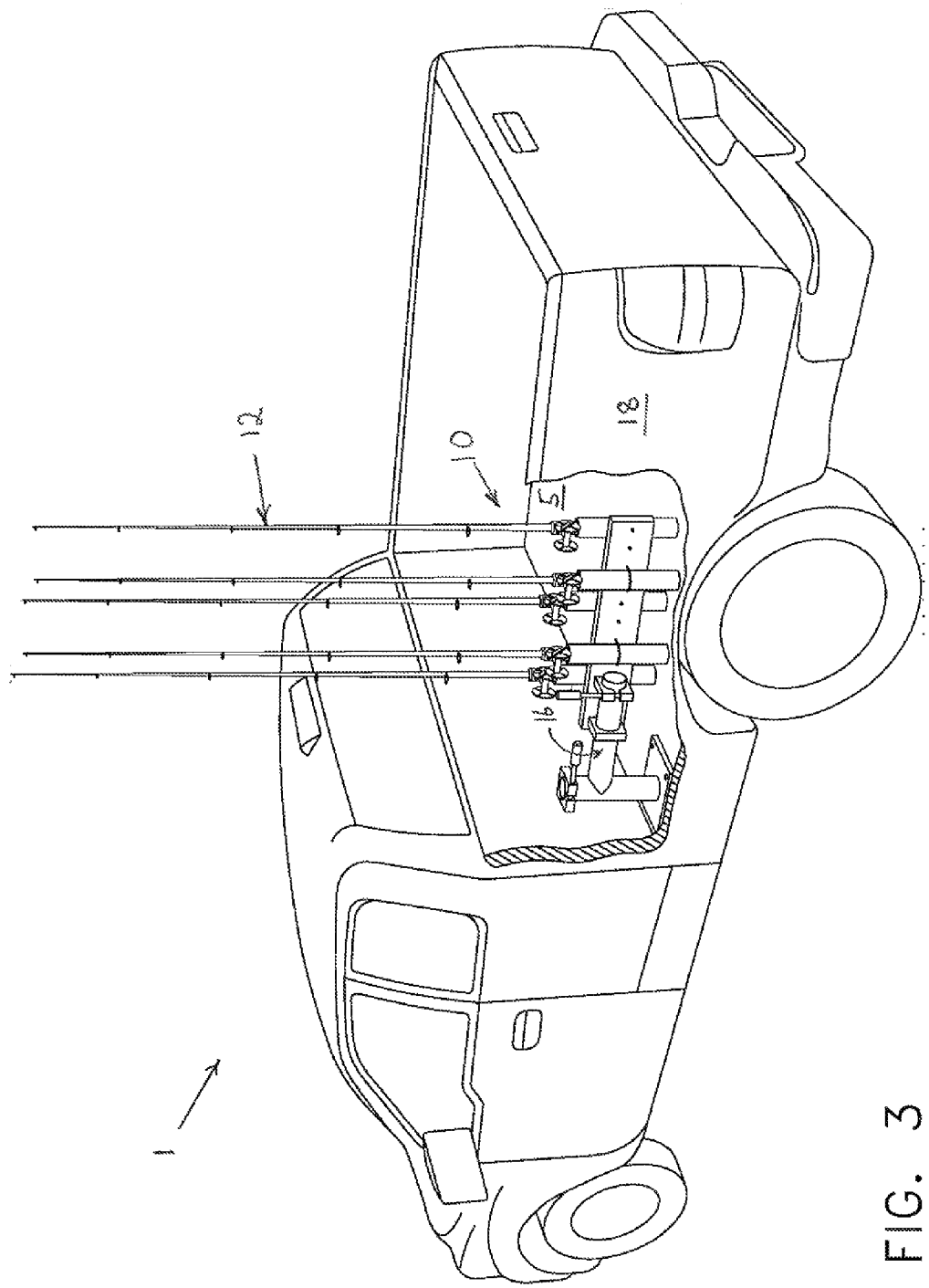
FIG. 3 is a perspective view of a fishing rod holder assembly installed in the bed of a pickup truck in the rotated fully deployed position.

As shown in FIGS. 1 through 3, a fishing rod holder assembly 10 is installed in bed 5 of a pickup truck 1. FIG. 1 shows fishing rods 12 presenting a low profile that protects fishing rods 12 during transport from the high velocity air currents caused by expressway speed and from any other obstacle that may interfere with the fishing rods 12 if they were left to stick up past cab 14 of pickup truck 1 as described in prior art patents.

FIG. 1 shows fishing rod holder assembly 10 in the stowed position with fishing rods 12 generally laying parallel to bed 5 of pickup truck 1. Mount tube 16 is parallel to cab 14 of pickup truck 1.

FIG. 2 shows fishing rod holder assembly 10 with fishing rods 12 in the vertical position with mount tube 16 still parallel to cab 14 of pickup truck 1.

FIG. 3 shows fishing rod holder assembly 10 in the fully deployed position with mount tube 16 rotated to a position parallel to side 18 of pickup truck 1 and fishing rods 12 still in the vertical position.

Figure 4:
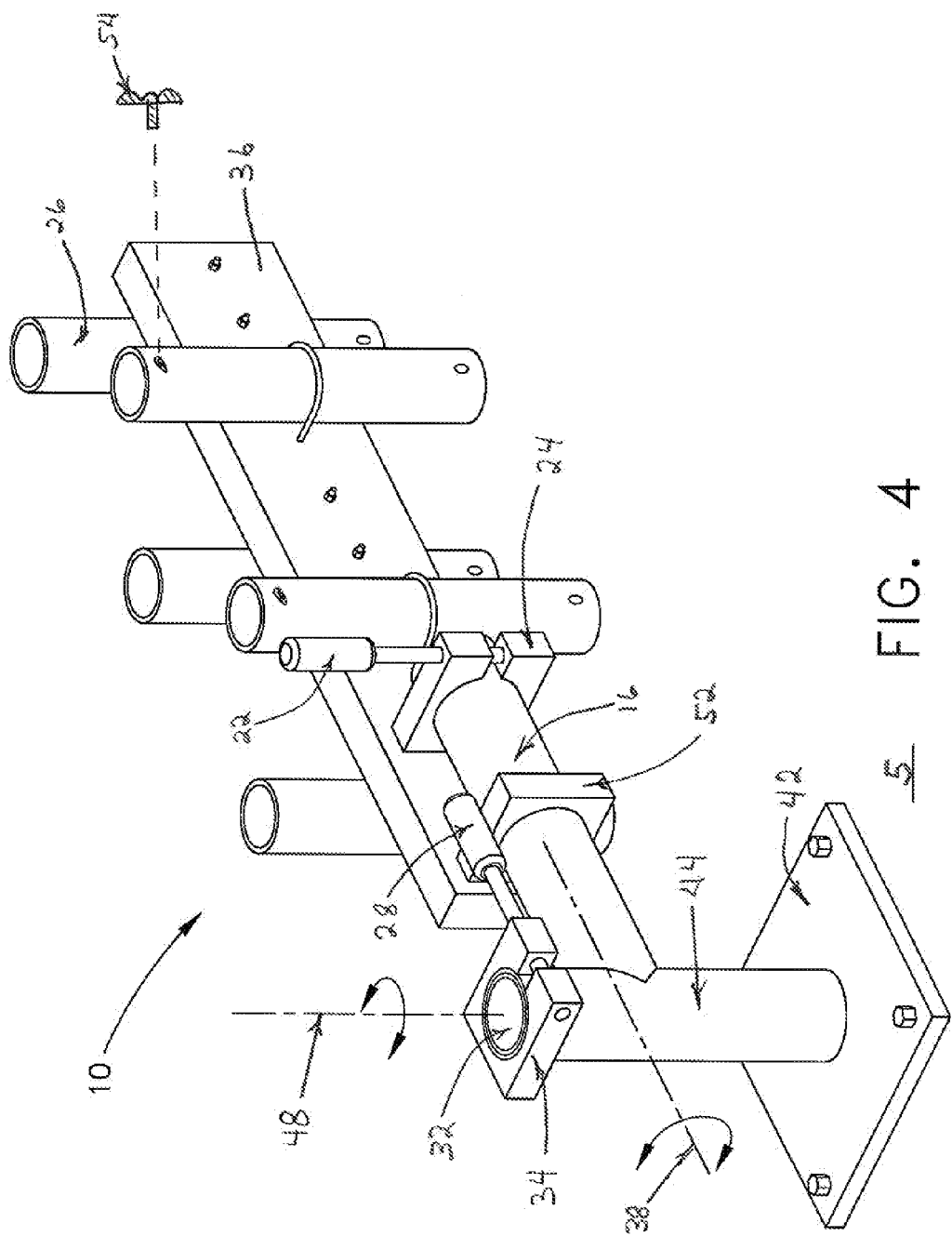
FIG. 4 is a perspective view of a fishing rod holder assembly utilizing a rod tube base.

FIG. 4 shows a manually operated embodiment of fishing rod holder assembly 10. Fishing rod holder assembly 10 has a base 42 attached to bed 5 of pickup truck 1 (not shown). Spindle 32 is vertically attached to base 42 and has vertical axis 48. Pivot tube 44 is coaxial with spindle 32 and is free to rotate around vertical axis 48. Mount tube 16 is horizontally attached to pivot tube 44. Rod tube base 36 is tiltably connected to mount tube 16 by tilt block 52 and tilt lock block 24. Rod tubes 26 are attached to rod tube base 36. Fishing rod holder assembly 10 is operated by first unscrewing stow release screw handle 22 on mount tube 16 which releases the friction force on mount tube 16 from tilt lock block 24. Stow release screw handle 22 is raised to rotate rod tube base 36 around horizontal axis 38 which orients rod tubes 26 to a vertical position. Tilt block 52 cooperates with tilt lock block 24 to maintain alignment of rod tube base 36 with mount tube 16 as rod tube base 36 is raised. After raising stow release screw handle 22 to orient rod tubes 26 to a vertical position, tilt lock block 24 re-engages mount tube 16 by friction force created by turning stow release screw handle 22 in to maintain the desired vertical position of fishing rods 12 (not shown). In a similar manner, pivot release screw handle 28 is unscrewed on pivot lock block 34 to release the friction force on spindle 32 so mount tube 16 can be pivoted around vertical axis 48 to a position parallel with side 18 of pickup truck 1 as shown in FIG. 3. Pivot lock block 34 re-engages spindle 32 by friction force created by turning pivot release screw handle 28 in to maintain the final deployed position of mount tube 16 along side 18 of pickup truck 1 as shown in FIG. 3.

Once in the deployed position, fishing rods 12 (not shown) can be easily removed from rod tubes 26 and re-stowed therein multiple times as desired. In all embodiments of this invention, fishing rods 12 (not shown) are removed from rod tubes 26 by turning retaining screw 54 counterclockwise to release the compression of fishing rod 12 (not shown) against the wall of rod tube 54.

Figure 5:
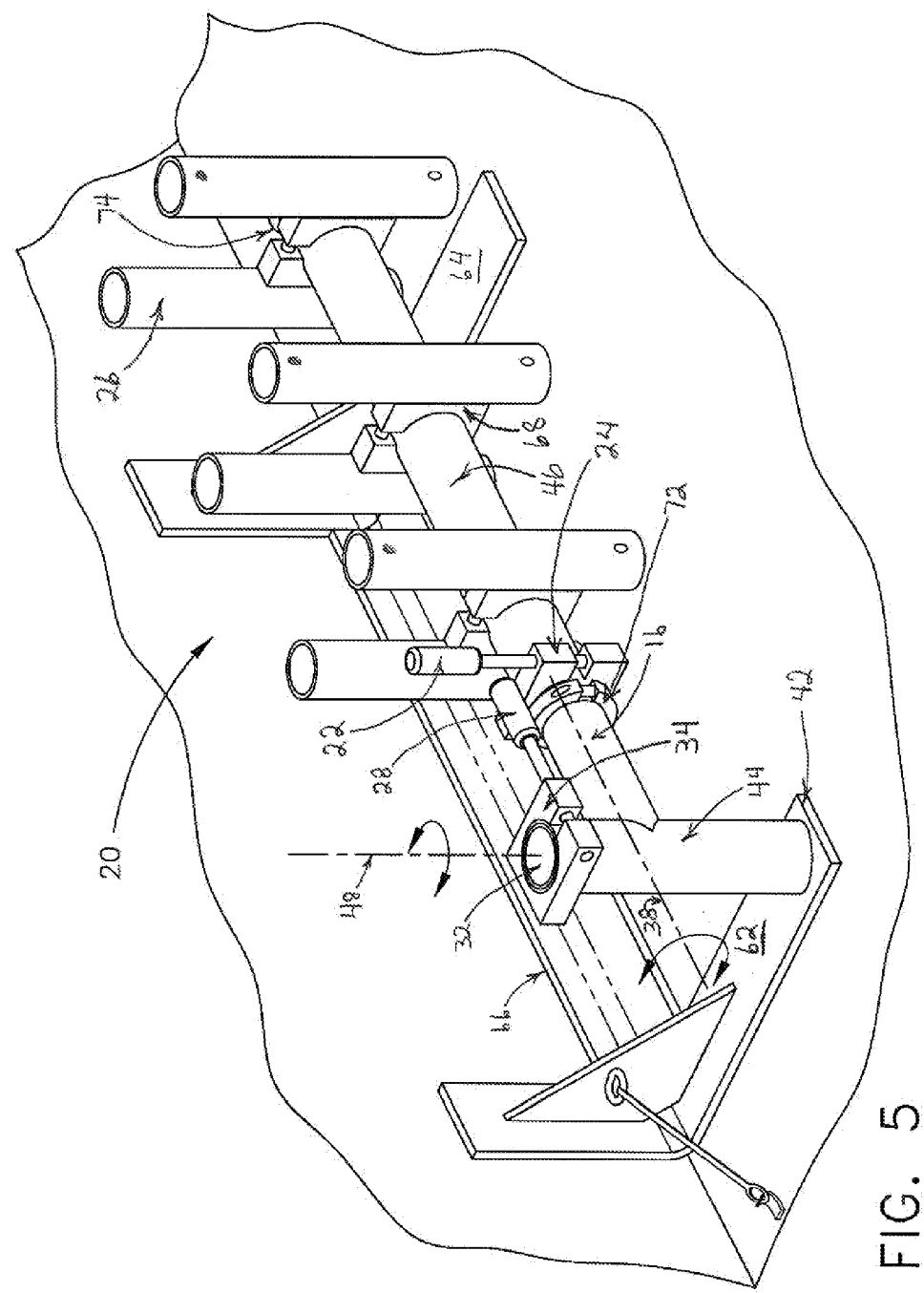
FIG. 5 is a perspective view of a fishing rod holder assembly utilizing a stow pivot tube.

FIG. 5 shows an alternate manually operated embodiment of fishing rod holder assembly 20. Fishing rod holder assembly 20 as shown in FIG. 5 has an alternate base 56 attached to bed 5 of pickup truck 1 (not shown). Base 56 has first and a second right angle brackets 62, 64 respectively spaced apart by one or more connecting struts 66 that secure fishing rod holder assembly 20 to bed 5 of a pickup truck 1 (not shown). Spindle 32 is vertically attached to base 56 and has vertical axis 48. Pivot tube 44 is coaxial with spindle 32 and is free to rotate around vertical axis 48. Mount tube 16 is horizontally attached to pivot tube 44. Stow pivot tube 46 is coaxial with mount tube 16 along horizontal axis 38 and free to translate along and to rotate around mount tube 16. Rod collar 72 and end collar 74 are fixedly attached to mount tube 16 to limit translation of stow pivot tube 46 along mount tube 16. Tilt lock block 24 is fixedly attached to stow pivot tube 46 and stow release screw handle 22 compresses tilt lock block 24 to create locking friction around mount tube 16 to lock stow pivot tube 46 in a fixed tilt position. Rod tubes 26 are fixedly attached to stow pivot tube 46 by rod tube mount blocks 68.

Fishing rod holder assembly 20 shown in FIG. 5 is operated by first unscrewing stow release screw handle 22 on tilt lock block 24 which releases the friction force on mount tube 16 from tilt lock block 24. Stow release screw handle 22 is raised to rotate stow pivot tube 46 around horizontal axis 38 which orients rod tubes 26 to a vertical position. After raising stow release screw handle 22 to orient rod tubes 26 to a vertical position, tilt lock block 24 re-engages mount tube 16 by friction force created by turning stow release screw handle 22 in to maintain the desired vertical position of fishing rods 12 (not shown). In a similar manner, pivot release screw handle 28 is unscrewed on pivot lock block 34 to release the friction force on spindle 32 so mount tube 16 can be pivoted around vertical axis 48 to a position parallel with side 18 of pickup truck 1 as shown in FIG. 3. Pivot lock block 34 re-engages spindle 32 by friction force created by turning pivot release screw handle 28 in to maintain the final deployed position of mount tube 16 along side 18 of pickup truck 1 as shown in the alternate embodiment of FIG. 3.

Once in the deployed position, fishing rods 12 (not shown) can be easily removed from rod tubes 26 and re-stowed therein multiple times as desired. Fishing rods 12 (not shown) are removed from rod tubes 26 by turning retaining screw 54, as shown in FIG. 4, counterclockwise to release the compression of fishing rod 12 (not shown) against the wall of rod tube 54.

Figure 6:
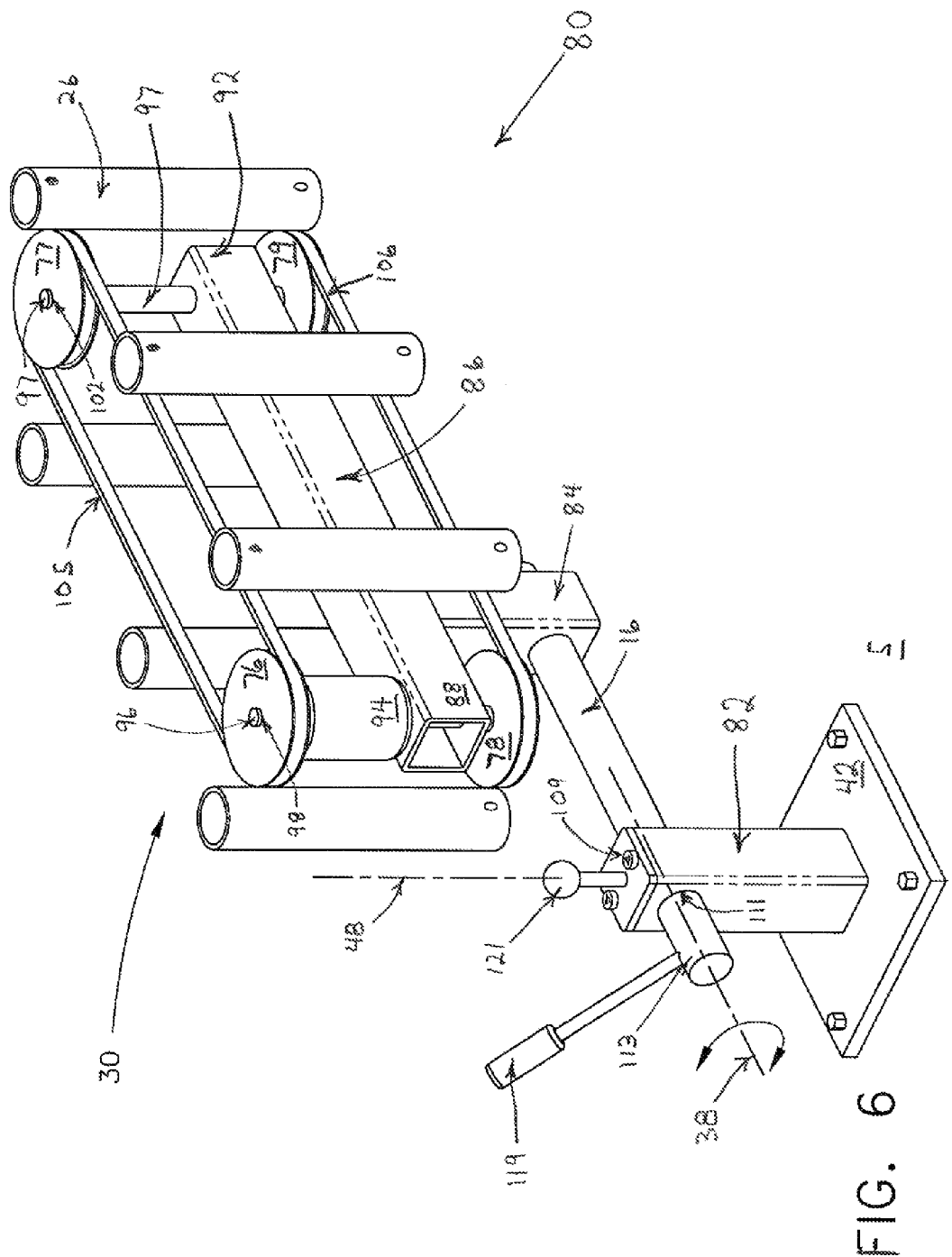
FIG. 6 is a perspective view of a fishing rod holder assembly utilizing a motorized rod tube base and incorporating a manual tilting means.
Figure 7:
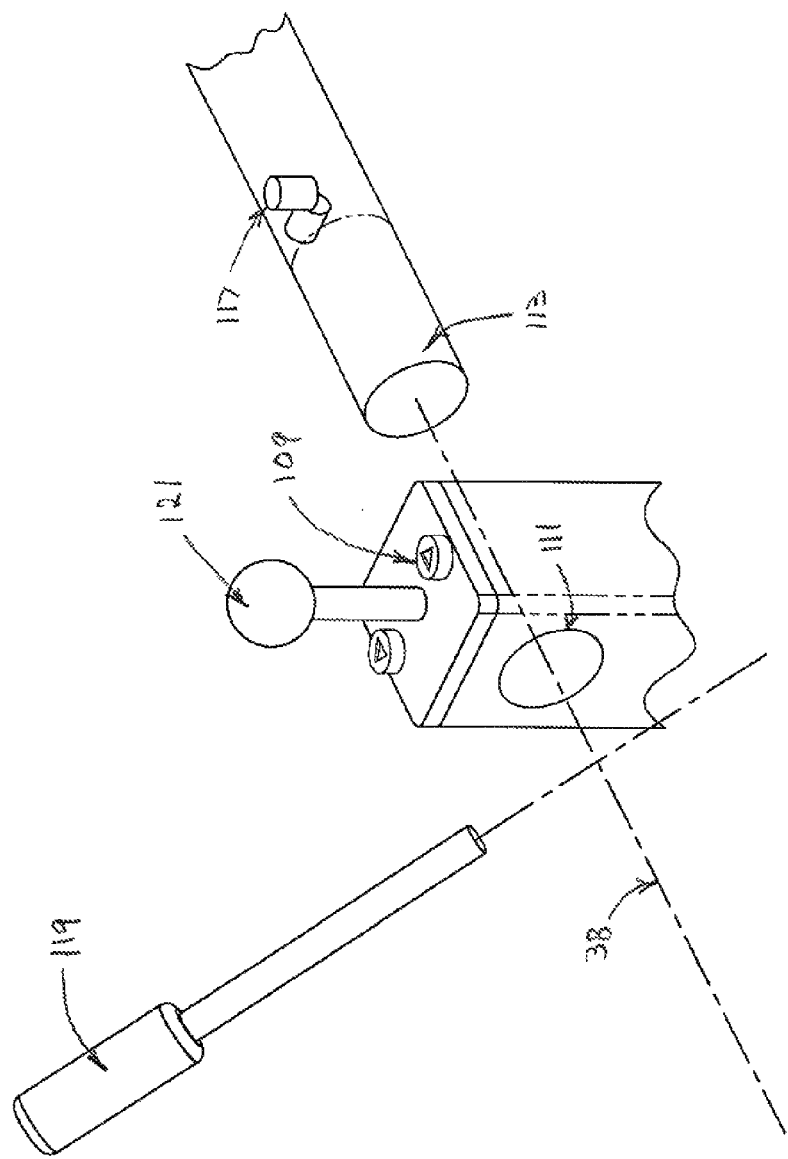
FIG. 7 is a segmented perspective view of the locking pin utilized as the manual tilting means in FIG. 6.

FIGS. 6 and 7 show fishing rod holder assembly 30 that has motorize sequencing of fishing rods 12 (not shown). Fishing rod holder assembly 30 as shown in FIG. 6 an 7 has spindle 82 with vertical axis 48 vertically attached to base 42. Base 42 is attached to bed 5 of pickup truck 1 (not shown). Mount tube 16 is horizontally attached to spindle 82 and has horizontal axis 38. Motorized rod tube base 80 is fixedly attached to the mount tube by an offset arm 84 and is located along and generally parallel to the horizontal axis 38. Motorized rod tube base 80 comprises holder tube 86 having proximal end 88 and distal end 92 fixedly attached to mount tube 16 by offset arm 84 and aligned generally parallel to horizontal axis 38 at a fixed distance from the mount tube 16. A reversible cassette motor 94 is attached to proximal end 88 of holder tube 86 and has a through output shaft 96 having an upper output end 98 and lower output end 99 collinear with each other and each located on opposing ends of through output shaft 96. Upper drive pulley 76 is secured to the upper output end 98 and lower drive pulley 78 is secured to the lower output end 99. An elongated idler shaft 97 extends through distal end 92 of holder tube 86 and is configured in parallel with through output shaft 96 having an upper idler 102 end and a lower idler end 103. Upper idler pulley 77 is rotationally attached to upper idler end 102 of idler shaft 97 and a lower idler pulley 79 is rotationally attached to lower idler end 103 of the elongated idler shaft 97. Upper conveyor 105 connects the upper drive pulley 76 and upper idler pulley 77. Lower conveyor 106 connects lower drive pulley 78 and lower idler pulley 79. A carousel path is formed by rod tubes 26 extending between and connected to the upper conveyor 105 and to the lower conveyor 106 and are configured in parallel with each other and spaced around upper conveyor 105 and lower conveyor 106. A control circuit (not shown) located on spindle 82 has control buttons 109 located on spindle 82 or at any other suitable position to conveniently cycle cassette motor 94 to sequentially position each of rod tubes 26 at proximal end 88 of the holder tube 86.

Motorized rod tube base 80 is positioned in a stowed position by rotating motorized rod tube base 80 around horizontal axis 38 of mount tube 16 to a desired tilt position. Mated through holes 111, more accurately shown in FIG. 7, pass through spindle 82 and are configured to receive mount tube 16. Emergent end 113 of mount tube 16 is created by extending mount tube 16 through mated through holes 111 in spindle 82. Locking hole 115 is located in spindle 82, either coaxial with spindle 82 as shown or perpendicular to vertical axis 48, and extends into mating through hole 111. A plurality of tilt holes 117 are spaced circumferentially around mount tube 16 and are configured to receive lock pin 121 as it is inserted through lock hole 115 to define a tilt position of motorized rod tube base 80. Stow handle 119 is perpendicularly attached to emergent end 113 of mount tube 16 and acts as a lever to facilitate the rotation of motorized rod tube base 80 to a desired tilt position in order to permit lock pin 121 to engage a corresponding tilt hole 117.

Figure 8:
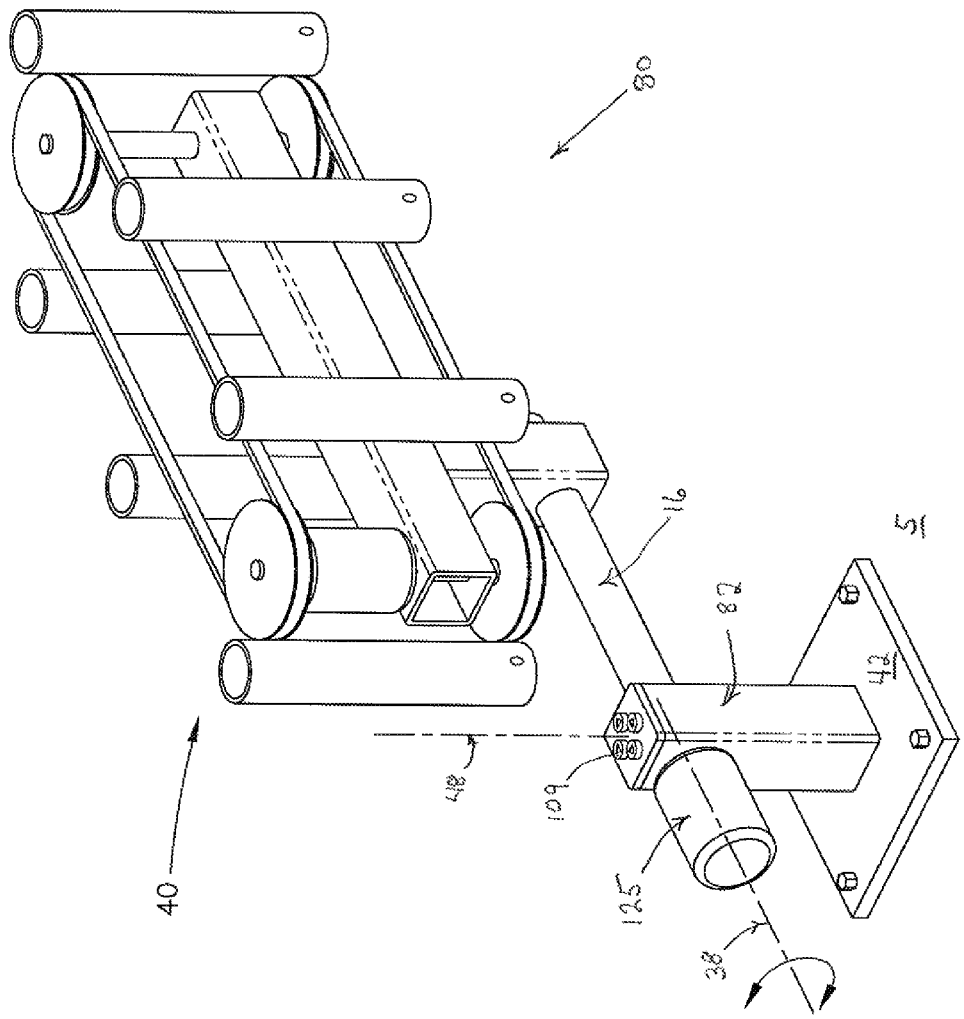
FIG. 8 is a perspective view of a fishing rod holder assembly utilizing a motorized rod tube base and incorporating a motorized tilting means.

FIG. 8 shows an alternate embodiment of the fishing rod holder assembly 30 shown in FIGS. 6 and 7. Fishing rod holder assembly 40 shown in FIG. 8 motorizes the tilt function. Rotation of motorized rod tube base 80 is performed with stow motor 125. Stow motor 125 is connected to emergent end 113 (connection not shown in FIG. 8) of mount tube 16 and configured to rotate mount tube 16 clockwise or counterclockwise to a desired tilt position. An electrical control circuit, located on spindle 82 has control buttons 109 located on spindle 82 or at any other suitable position to conveniently cycle cassette motor 94 to sequentially position each rod tube 26 at proximal end 88 of the holder tube 86 and to conveniently rotate motorized rod tube base 80 clockwise or counterclockwise to raise motorized rod tube base 80 to a vertical deployed position or to lower motorized rod tube base 80 to a horizontal towed position.

I claim:

1. A fishing rod holder assembly for securing, transporting, and dispensing a plurality of fishing rods, said fishing rod holder assembly comprising:
   a base;
   a cylindrical spindle vertically attached to said base having a vertical axis;

a cylindrical pivot tube coaxial with said cylindrical spindle configured to pivot around said vertical axis;

a mount tube horizontally attached to said pivot tube having a horizontal axis;

a rod tube base tiltably attached to said mount tube and located along said horizontal axis having a plurality of rod tubes each configured for securing, transporting and dispensing a fishing rod;

a means for pivoting said mount tube around said vertical axis;

a tilt block fixedly attached to said rod tube base and surrounding said mount tube; and a tilt lock block fixedly attached to said rod tube base surrounding said mount tube aligned with said tilt block along said mount tube having a stow release screw handle for locating and locking said rod tube base in a desired tilt position.

2. A fishing rod holder assembly as described in claim 1 wherein said pivoting means comprises:

a pivot lock block fixedly attached to said pivot tube and surrounding said spindle; and a pivot release screw handle for locating and locking said pivot tube in a desired pivot position.

3. A fishing rod holder assembly for securing, transporting, and dispensing a plurality of fishing rods, said fishing rod holder assembly comprising:

a base;

a cylindrical spindle vertically attached to said base having a vertical axis;

a cylindrical pivot tube coaxial with said cylindrical spindle configured to pivot around said vertical axis;

a mount tube horizontally attached to said pivot tube having a horizontal axis;

a rod tube base tiltably attached to said mount tube and located along said horizontal axis having a plurality of rod tubes each configured for securing, transporting and dispensing a fishing rod;

a means for pivoting said mount tube around said vertical axis;

said rod tube base configured as a stow pivot tube coaxial with said mount tube having said plurality of rod tubes each configured for securing, transporting and dispensing a fishing rod;

an end collar and a rod collar that limits axial movement of said stow pivot tube along said mount tube; and a tilt lock block fixedly attached to said stow pivot tube surrounding said mount tube having a stow release screw handle for locating and locking said stow pivot tube in a desired tilt position.

4. A fishing rod holder assembly as described in claim 3 wherein said pivoting means comprises:

a pivot lock block fixedly attached to said pivot tube and surrounding said spindle; and a pivot release screw handle for locating and locking said pivot tube in a desired pivot position.

* * * * *